Oct. 18, 1960     H. BOPP     2,957,062
FREQUENCY RELAY

Filed Dec. 14, 1955     2 Sheets-Sheet 1

United States Patent Office 2,957,062
Patented Oct. 18, 1960

2,957,062

FREQUENCY RELAY

Hans Bopp, Frankfurt am Main, Germany, assignor to Hartmann & Braun Aktiengesellschaft, Frankfurt am Main, Germany, a corporation of Germany Filed Dec. 14, 1955, Ser. No. 553,109

Claims priority, application Germany Dec. 20, 1954

2 Claims. (Cl. 200—91)

This invention relates to frequency relays. Frequency relays comprise mechanical vibrating systems with electromagnetic excitation which vibrate only at a definite exciting frequency. Furthermore means are provided for indicating these vibrations, for instance by means of a contact. Such frequency relays are often constituted by a leaf spring put under stress at one end and having a definite spring rate. Such a spring has an exactly defined resonance frequency which can be influenced by varying the spring rate or the mass of said spring.

The general object of the invention is to provide a relay actuating the contacts in an exactly defined frequency band of finite width. The relay of the invention claimed herein has a similar characteristic as a band filter.

A further object of the invention is to determine the resonance width by a simple method.

Furthermore the invention provides for a frequency relay the response of which exclusively depends on the frequency of the exciter and not on the energy of the exciter oscillations.

These advantages are of special importance for frequency relays destined for selective calling systems in radio engineering. Owing to the exactly defined range of resonance frequency which can be influenced by selecting the characteristic values such as spring rate of the spring and vibrating masses, it is possible to arrange a comparatively great number of relays with separate response in one frequency band available for wireless communication. Further advantages of the frequency relay being subject matter of the invention are revealed by the description of the working principle.

According to the invention the vibrating system consists of several individual vibrating systems being mechanically coupled, the individual systems and the mechanical coupling being so dimensioned and constructed that the relay shows the characteristic of a band filter.

Figure 1:
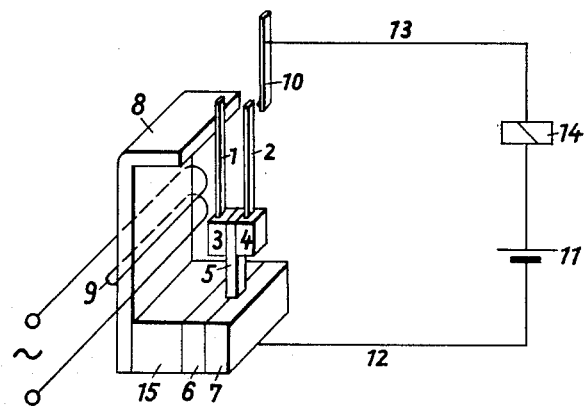
Fig. 1 illustrates an example of an assembled mechanical frequency relay according to the invention.

An example of a frequency relay according to the invention is described in full details by Fig. 1.

The arrangement is constituted by two individual vibrating systems comprising each a metal reed tightened unilaterally (primary reed and secondary reed). The primary reed is designated with number 1. It is arranged in metal block 3, the latter being attached to an elastic metal leaf 5. Reed 2 rests with one end in metal block 4, the latter also being fixed to the same metal leaf 5. The metal leaf 5 proper is held between the two metal plates 6 and 7. The primary reed 1 and the metal holder 3, the metal leaf 5 and the metal plate 6 belong to the exciting circuit of the electric magnet 8 and are of ferromagnetic material. In this circuit a permanent magnet may be arranged which is marked with 15 in the illustration. This permanent magnet causes the reed to vibrate with the single and not with the double exciting frequency. The same effect can be obtained by superposition of a D.-C. on the exciting A.-C. If none of these measures is provided, the characteristics of the reed must be construed for the double exciting frequency. By means of the electromagnet 8 the exciting coil 9 of which transmits the electric signal, the primary reed 1 is caused to vibrate if the frequency of the electric signal is near its resonance frequency. The secondary reed 2 situated opposite the primary reed 1 is of non-magnetic material and is therefore not influenced by the electromagnet. Owing to the fact, however, that the secondary reed is fixed at one end rigidly to the metal leaf and thus coupled elastically to the primary reed, the vibrations of the primary reed are transmitted to the secondary reed. If the secondary reed starts vibrating, it touches intermittently the opposite contact plate 10. The contact plate 10 and the secondary reed 2 are arranged in a circuit feed by battery 11. Therefore in case of a contact between the secondary reed 2 and the contact spring 10 there is a current flowing from battery 11 across the lead 12, metal plate 7, metal plate 5, holder 4, secondary reed 2, contact plate 10 and lead 13 back to battery 11. In this circuit which during vibrations of the secondary reed is closed intermittently, relay 14 is connected indicating the contact between the secondary reed 2 and the contact plate 10. The mechanical coupling between primary reed 1 and secondary reed 2 can be varied by altering the dimensions of metal leaf 5 or the masses of blocks 4 and 5 or both dimensions. Also by altering the dimensions or the material of the reeds it is possible to vary the characteristic. By an appropriate selection of these values determining the characteristic, it is always possible to obtain a contact of the secondary reed only within a narrow frequency range and highly independent from the power of the arriving electric signal.

Figure 2:
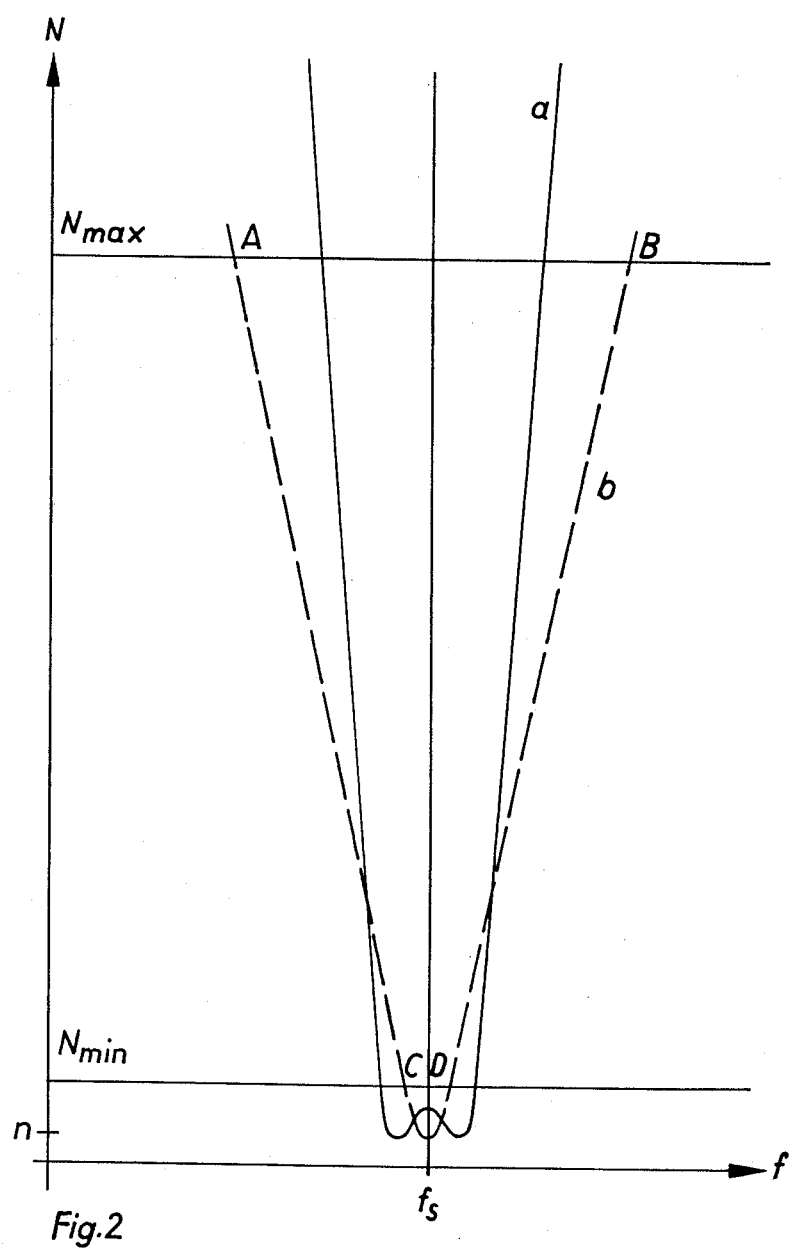
Fig. 2 shows another efficient type according to the invention.

Fig. 2 shows the principle of operation of the frequency relay referred to by the invention. The frequency is depicted on the abscissa and the power of the signal on the ordinate. $f_s$ stands for the frequency the exciting signal is supposed to have and to which the frequency relay is adjusted. The curves show the minimum power of the exciting signal required for obtaining a contact by means of the relay as a function of the frequency of the signal (characteristic). The dashed curve $b$ representing the characteristic of a common relay with one reed as the vibrating system shows the actuating bands of the relay for the different powers of the exciting signal by drawing a parallel to the abscissa through the point of the ordinate corresponding to the exciting power. The portion cut off from curve $b$ on this parallel represents the actuating band at the respective exciting power. It can be observed that the width of the actuating band increases with an increase of the exciting power. If the minimum power to be expected is designated with $N_{min}$ and the maximum power with $N_{max}$, then the respective actuating bands CD and AB are obtained. The shorter AB, the nearer the frequency of an adjacent transmitter station can be situated to the frequency $f_s$.

On the other side the width of the actuating band must not become too small. This is due to the fact that the desired frequency of the signaling transmitter to which the relay is tuned cannot always be maintained accurately and also the resonance frequency of the vibrating system fluctuates due to various influences among which the ambient temperature plays a major part. The shifting of these two frequencies which should be equal, may cause at a very narrow resonance curve that the frequency of the exciting signal is no more within the response band and therefore the relay does not respond to the signal. The minimum width of the response band is determined by the maximum fluctuations of the transmitter frequency to be expected and the resonance frequency of the relay.

Curve "$a$" of Fig. 2 shows the characteristic of a relay according to the invention, i.e. two coupled systems. It resembles the characteristic known from band filters and is therefore designated "band filter characteristic." The sides of curve "$a$" are steeper and the response band is more narrow at $N_{max}$, whereas for $N_{min}$ it is larger than for characteristic "$b$." There does not exist a resonance at one definite frequency, but apart from a slight anticlinal formation the amplitude of oscillation over a definite band width is independent from the frequency.

In this way a considerable improvement is obtained. When providing for a suitable construction and design of the respective vibrating systems and the mechanical coupling between them, the width of the response band can be increased at $N_{min}$ for assuring that the relay always responds, provided the fluctuations of the signaling frequency and of the resonance frequency of the relay are within the limits to be expected. For the construction claimed for by the invention these alterations can be carried out very easily.

Fig. 2 shows that the relay only responds to powers exceeding the value "$n$" which represents the ordinate of the lowest point of the characteristic. This is important, as in this way it can be prevented that the relay responds to noises which always exist.

In the presence of such a band filter characteristic with finite width as obtained by the invention according to the explanations, there is a rapid phase change within the response band of the two vibrating systems. This phase change takes place approximately in the middle of the band at the lowest point of the anticlinal formation. At lower frequencies the reeds are in phase, whereas at higher frequencies they are in phase opposition.

It proved to be advantageous to select the same resonance frequency for both the secondary reed and the primary reed. If a secondary reed of magnetically indifferent material is chosen as for the first example, primary and secondary reed can be arranged close to each other and in this way a very compact arrangement is obtained. The primary and second reed should preferably be chosen with approximately the same temperature coefficient.

Figure 3:
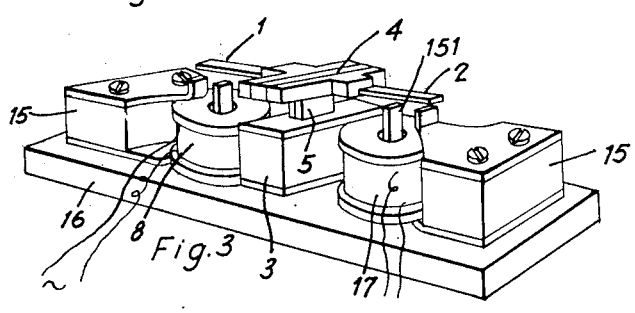
Fig. 3 shows a graph on the behaviour of a frequency relay according to the invention as compared to a simple frequency relay consisting of one vibrating leaf spring.

It is suitable for the object in view to use for the frequency relay of the invention leaf springs with a sharp resonance. This can be assured by twisting the leaf springs (primary or secondary reed or even both) by 90° some millimeters above their supporting point as explained by Fig. 3 showing the primary reed 1 held by support 3. The direction of vibration is marked by arrows. The increase of selectivity is obtained in the following way: the characteristic of the resonance curve depends on the damping. The damping is based on the kind of material and on the air damping. The twisting causes a considerable decrease of the air damping. Therefore the total damping is lower and the resonance being sharper at lower damping, the aforementioned effect results in a sharper resonance. This increase of the sharpness of resonance is of general importance when using reeds as frequency indicators.

Another suitable construction of the frequency relay according to the invention is shown by Fig. 3. Also in this case the vibrating system is constituted of two metal reeds 1 and 2, both being attached at their end in the metal block 4 in such a manner that their free ends show in opposite direction.

They are both of ferromagnetic material. The metal block 4 is fastened to one end of the leaf spring 5, the other end of which being attached rigidly to the attachment 3 of the instrument.

The coil exciting reed 1 is again designated with 8. A permanent magnet 15 is arranged in its core. Reed 2, however, does not actuate a contact, but alters the magnetic flux of the indicator coil 17 when starting vibrating, this coil being of the same construction as the exciter coil and also containing a permanent magnet 151 as core. Due to this arrangement an alternating voltage is induced in coil 17 which is used for the indication.

Additional vibrating systems can be arranged for adapting the characteristic of the relay to further requirements. There may exist, for instance, three, four or more reeds coupled mechanically similar to the example outlined above by providing for a common elastic support. By an appropriate tuning of the reeds and by selecting the coupling accordingly it is possible to influence the steepness of the flanks and the characteristic of the anticlinal formation.

Figures 4, 5:
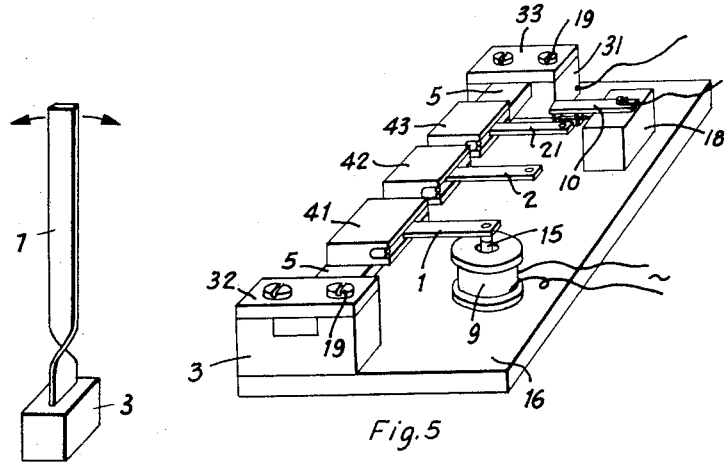
Fig. 4 shows a suitable construction of a vibrating leaf spring.
Fig. 5 shows another design of a frequency relay according to the invention.

Fig. 5 shows an example of this construction. On base plate 16 two metal attachments 3 and 31 are fastened, between the latter an elastic metal strip 5 being stretched which is kept tightly to the attachments by plates 32 and 33 and screws 19. On the metal band the vibrating systems are fixed (in the construction under discussion three systems). They are each composed of the elastic reeds 1, 2 and 21 fastened unilaterally to the blocks 41, 42 and 43. A coil 9 with permanent magnet core 15 is arranged below one of these reeds, in the present case reed 1, and serves for the excitation of the system. Above another reed, in the present case reed 21, and fixed to a block 18 of insulation material there is plate 10 which establishes a contact if this reed vibrates. As a matter of fact, it is possible to use for the indication of vibrations of the system an indicator coil as shown by Fig. 2 instead of the contact devices 10 and 18.

When using an installation for selective calls, the relays according to the invention are arranged one beside the other and so designed that their characteristics do not overlap in the range to be expected.

I claim as my invention:

1. A frequency relay comprising two mechanically mutually resonant tine-like vibratory reeds, one being at least in part of magnetic material and the other of non-magnetic material; a third vibratory reed having a substantially constant inherent frequency, the two first mentioned reeds being mounted to form a fork fast on the third reed, each on the vibratory end thereof; an inductive coil for actuating the one of the mutually vibratory reeds having magnetic material, such reed being substantially free to vibrate over a substantially unlimited range, the other of the resonant reeds being non-magnetic to prevent action by the coil thereon when the reeds move toward the coil, and non-magnetic pick-up means on the other mutually vibratory reed for indicating the vibratory motion thereof; the masses and the elasticity of the three reeds together being of such value that the whole system comprised thereof vibrates in resonance in a substantially exactly defined frequency range with nearly constant amplitude like a band filter.

2. A frequency relay comprising two mechanically mutually resonant tine-like vibratory reeds, the first being at least in part of magnetic material and the second of non-magnetic material; a third vibratory reed having a substantially constant inherent frequency, the two resonant reeds being mounted to form a fork fast on the third reed, each on the vibratory end thereof; an inductive coil for actuating the first reed, such reed being substantially free to vibrate over a substantially unlimited range, and switch means on the second reed for controlling an external circuit in accordance with vibratory motion of the second reed as the reeds move toward and away from the coil, the masses and the elasticity of the three reeds together being of such value that the whole system comprised thereof vibrates in resonance in a substantially exactly defined frequency range with nearly constant amplitude like a band filter.

References Cited in the file of this patent

UNITED STATES PATENTS

| | | |
|---|---|---|
| 1,585,508 | Oliver | May 18, 1926 |
| 1,654,123 | Hartley | Dec. 27, 1927 |
| 1,708,945 | Horton | Apr. 16, 1929 |
| 2,163,195 | Edwards | June 20, 1939 |
| 2,406,800 | Busignies | Sept. 3, 1946 |
| 2,486,394 | Earrarino | Nov. 1, 1949 |
| 2,622,168 | Shields | Dec. 16, 1952 |
| 2,681,588 | Dyner | June 22, 1954 |

FOREIGN PATENTS

| | | |
|---|---|---|
| 30,031 | Sweden | Feb. 4, 1910 |
| 459,964 | Germany | May 15, 1928 |
| 892,344 | Germany | Oct. 5, 1953 |